United States Patent
Saji et al.

(10) Patent No.: US 9,482,313 B2
(45) Date of Patent: Nov. 1, 2016

(54) ENGAGEMENT CHAIN UNIT (75) Inventors: Tomoyuki Saji, Osaka (JP); Keisuke Murakami, Osaka (JP)

(73) Assignee: TSUBAKIMOTO CHAIN CO., Osaka (JP)

( * ) Notice: Subject to any disclaimer, the term of this patent is extended or adjusted under 35 U.S.C. 154(b) by 393 days.

(21) Appl. No.: 14/112,077

(22) PCT Filed: Mar. 15, 2012

(86) PCT No.: PCT/JP2012/056703
§ 371 (c)(1),
(2), (4) Date: Oct. 16, 2013

(87) PCT Pub. No.: WO2012/144281
PCT Pub. Date: Oct. 26, 2012

(65) Prior Publication Data
US 2014/0041467 A1  Feb. 13, 2014

(30) Foreign Application Priority Data

Apr. 20, 2011  (JP) ................. 2011-094434

(51) Int. Cl.
*F16H 19/06* (2006.01)
*F16G 13/04* (2006.01)
*F16G 13/20* (2006.01)
*B66F 3/06* (2006.01)

(52) U.S. Cl.
CPC ............ *F16G 13/04* (2013.01); *B66F 3/06* (2013.01); *F16G 13/20* (2013.01); *F16H 19/0636* (2013.01); *Y10T 74/18096* (2015.01)

(58) Field of Classification Search
CPC ....... F16H 19/0636; B66F 3/06; F16G 13/20
See application file for complete search history.

(56) References Cited

U.S. PATENT DOCUMENTS 2,574,657 A * 11/1951 Pierce ................. B66F 3/06
254/1
3,645,146 A *  2/1972 Nagin ................ F16G 13/06
254/133 R
3,976,166 A    8/1976 Charpentier
(Continued)

FOREIGN PATENT DOCUMENTS

CA       2070284       4/1992
CN      101027504       8/2007
(Continued)

OTHER PUBLICATIONS

Official Action for China Patent Application No. 201280018797.7, dated Jul. 31, 2015, 5 pages.
(Continued)

*Primary Examiner* — David M Fenstermacher
(74) *Attorney, Agent, or Firm* — Sheridan Ross P.C.

(57) ABSTRACT

Provided is an interlocking chain unit configured such that chains reliably and firmly engage with each other and that the buckling and twisting of a rigidified chain portion are avoided. An interlocking chain unit is configured such that the outer edges of a plate overlap region (P) are defined by contact portion faces and flat buckling restricting end faces, and that the plate overlap region (P) is constructed from the outlines of two plate overlap portions (Pa, Pa) which are point-point-symmetric about the point (C) of intersection between hook-shaped interlocking end faces and the buckling restricting end faces.

6 Claims, 6 Drawing Sheets

(56) References Cited

U.S. PATENT DOCUMENTS

| | | |
|---|---|---|
| 5,355,643 A | 10/1994 | Bringolf |
| 5,690,571 A | 11/1997 | Mott |
| 5,895,880 A | 4/1999 | Golden |
| 7,921,986 B2 | 4/2011 | Ando |
| 2006/0219144 A1 | 10/2006 | Phelan et al. |
| 2008/0315168 A1* | 12/2008 | Takeuchi ............ B66F 7/0666 254/358 |
| 2009/0118048 A1* | 5/2009 | Takashima ........... B66F 7/0666 474/215 |
| 2009/0124444 A1 | 5/2009 | Soerensen |
| 2009/0166155 A1 | 7/2009 | Hishioka et al. |
| 2010/0051424 A1 | 3/2010 | Suko et al. |
| 2010/0059727 A1 | 3/2010 | Suko |
| 2010/0140572 A1 | 6/2010 | Aoki |
| 2013/0276422 A1 | 10/2013 | Saji |
| 2013/0283945 A1 | 10/2013 | Kaisaku et al. |
| 2013/0298705 A1 | 11/2013 | Saji et al. |
| 2013/0312554 A1 | 11/2013 | Saji et al. |

FOREIGN PATENT DOCUMENTS

| | | |
|---|---|---|
| EP | 0799788 | 10/1997 |
| EP | 0829659 | 3/1998 |
| EP | 2708775 | 3/2014 |
| JP | 51-131060 | 11/1976 |
| JP | S64-058883 | 3/1989 |
| JP | H03-012646 | 1/1991 |
| JP | H05-3300 | 1/1993 |
| JP | 6-13399 Y2 | 4/1994 |
| JP | 9-119495 A | 5/1997 |
| JP | H11-278797 | 10/1999 |
| JP | 3384491 | 12/2002 |
| JP | 2007-269414 | 10/2007 |
| JP | 2008-256202 | 10/2008 |
| JP | 2009-001398 | 1/2009 |
| JP | 2009-113872 A | 5/2009 |
| JP | 2009-242010 | 10/2009 |
| JP | 2009-255997 | 11/2009 |
| JP | 2010-047384 A | 3/2010 |
| JP | 2010-065721 A | 3/2010 |
| JP | 2010-138926 | 6/2010 |
| WO | WO 92/07154 | 4/1992 |

OTHER PUBLICATIONS

Extended Search Report for European Patent Application No. 12774681.6, dated Sep. 9, 2015, 9 pages.

International Search Report prepared by the Japanese Patent Office on Jun. 12, 2012, for International Application No. PCT/JP2012/056703.

International Search Report prepared by the Japanese Patent Office on Jan. 17, 2012, for International Application No. PCT/JP2011/078679.

International Search Report prepared by the Japanese Patent Office on Mar. 13, 2012, for International Application No. PCT/JP2011/078755.

International Search Report prepared by the Japanese Patent Office on Apr. 17, 2012, for International Application No. PCT/JP2011/080166.

International Search Report prepared by the Japanese Patent Office on Apr. 17, 2012, for International Application No. PCT/JP2011/080160.

International Search Report prepared by the Japanese Patent Office on Jul. 17, 2012, for International Application No. PCT/JP2012/061567.

* cited by examiner

ENGAGEMENT CHAIN UNIT

CROSS-REFERENCE TO RELATED APPLICATIONS

This application is a national stage application under 35 U.S.C. 371 and claims the benefit of PCT Application No. PCT/JP2012/056703 filed Mar. 15, 2012, which designated the United States, which PCT Application claimed the benefit of Japanese Patent Application No. 2011-094434 filed on Apr. 20, 2011, the disclosure of each of which are incorporated herein by reference.

FIELD OF THE INVENTION

The present invention relates to an interlocking chain unit used in manufacturing facilities in various manufacturing fields, transportation facilities in the transportation field, nursing care facilities in medical and welfare fields, and stage facilities in art fields, and moving a driven body forward and backward.

BACKGROUND OF THE INVENTION

Conventionally, as a drive unit, a drive unit is known that moves a driven object such as a heavy object by using a pair of interlocking chains, which are also referred to as zip chains. Specifically, the pair of interlocking chains are interlocked with each other and integrally driven (for example, refer to Patent Document 1).

Also, a silent chain transmission device has known in which noise and vibrations caused in driving of chains are suppressed by defining shapes of faces of link plates to be interlocked with inner flanks, i.e., sprocket teeth (for example, refer to Patent Document 2).

PRIOR ART DOCUMENTS

Patent Documents

Patent Document 1: Japanese Laid-Open Patent Publication No. 2009-113872 (refer to Claims and FIG. 5)
Patent Document 2: Japanese Laid-Open Utility Model Publication No. 6-13399 (refer to Claim and FIG. 1)

SUMMARY OF THE INVENTION

However, the above-described prior art related to the interlocking chains does not mention specific design matters such as interlocking end faces for engaging inner tooth plates and outer tooth plates with each other and buckling restricting end faces for restricting buckling. Therefore, it is difficult to firmly and reliably engage the inner tooth plates with the outer tooth plates.

Moreover, in the above-described interlocking chains, uneven compression forces are applied to the inner tooth plates and the outer tooth plates when these plates are interlocked with each other and therefore it is difficult to avoid buckling caused in a rigidified chain portion of the pair of interlocking chains, which are interlocked and integrated with each other, and twisting of the rigidified chain portion.

In other words, unavoidable clearance backlash between parts remains in the chains after the interlocking. Therefore, it is difficult to avoid the buckling caused in the rigidified chain portion and the twisting of the rigidified chain portion by suppressing application of the uneven compression forces in the interlocking.

Therefore, a technical problem to be solved by the invention, i.e., an object of the invention is to provide an interlocking chain unit in which inner tooth plates and outer tooth plates are reliably and firmly interlocked with each other and rigidity of the pair of interlocking chains, which are interlocked and integrated with each other, is increased to thereby avoid buckling and twisting of the rigidified chain portion.

To solve the above described problems, the invention according to claim 1 provides an interlocking chain unit comprising a pair of interlocking chains. Each interlocking chain is formed by connecting, with pairs of front and rear coupling pins, a large number of inner tooth plates and a large number of outer tooth plates in a chain longitudinal direction. The outer tooth plates are arranged to be adjacent to outer sides of the inner tooth plates and have partial overlap regions with the inner tooth plates. The interlocking chains are configured to become interlocked with each other to integrally become rigid in a rigid chain forward and backward movement direction and to become disengaged from each other to bifurcate. When the pair of interlocking chains are interlocked with each other, hook-shaped interlocking end faces of the two inner tooth plates interlocked with each other form plate overlap regions when the pair of interlocking chains are seen in a plate normal direction, which is orthogonal to plate main faces of the inner tooth plates and the outer tooth plates. Respective buckling restricting end faces of the two outer tooth plates come in contact with each other in a diagonal direction with respect to the rigid chain forward and backward movement direction. The plate overlap regions are formed by outlines of the two plate overlap portions having outer edges defined by contact portion faces, where the hook-shaped interlocking end faces of the two inner tooth plates are in contact with each other, and flat buckling restricting end faces of the two outer tooth plates in contact with each other. General shapes of the outlines of the two plate overlap portions are point-symmetric about a point of intersection between the hook-shaped interlocking end faces and the buckling restricting end faces. Any or all of the inner tooth plates, the outer tooth plates, and the coupling pins are elastically deformed to make the pair of interlocking chains rigid and to remove play between parts in forming the plate overlap regions.

To solve the above described problems, the invention according to claim 1 provides the interlocking chain unit according to claim 1, in which the pair of interlocking chains are interlocked with each other by chain movement restricting means for restricting movements of the pair of interlocking chains in the rigid chain forward and backward movement direction.

To solve the above described problems, the invention according to claim 3 provides the interlocking chain unit according to claim 2, in which the chain movement restricting means is a drive sprocket provided in an interlocking chain type forward and backward actuating device configured to move a driven body forward and backward according to chain forward and backward movements based on interlocking and disengagement of the pair of interlocking chains.

The interlocking chain unit according to claim 1 of the present invention includes a pair of interlocking chains each formed by connecting, with pairs of front and rear coupling pins, a large number of inner tooth plates and a large number of outer tooth plates in a chain longitudinal direction. The outer tooth plates are arranged to be adjacent to the outer sides of the inner tooth plates and have partial overlap regions with the inner tooth plates. The interlocking chains are configured become interlocked with each other to integrally become rigid and to become disengaged from each other to bifurcate. Therefore, it is possible to switch between the rigid state of the chains and the bifurcating state of the chains according to the forward and backward movements of the pair of interlocking chains, and also to exert particular effects corresponding to the following unique structures.

In the interlocking chain unit according to claim 1, when the pair of interlocking chains are interlocked with each other, the hook-shaped interlocking end faces of the two inner tooth plates interlocked with each other form the plate overlap regions when the pair of interlocking chains are seen in the plate normal direction orthogonal to the plate main faces of the inner tooth plates and the outer tooth plates. The plate overlap regions are formed by the outlines of the two plate overlap portions having the outer edges defined by the contact portion faces where the hook-shaped interlocking end faces of the two inner tooth plates are in contact with each other and the flat buckling restricting end faces of the two outer tooth plates in contact with each other. General shapes of the outlines of the two plate overlap portions are point-symmetric about the point of intersection between the hook-shaped interlocking end faces and the buckling restricting end faces. As a result, without unevenness of compression forces acting on the buckling restricting end faces on opposite sides of a center of the interlocking chain unit, displacement of the hook-shaped interlocking end faces interlocked with each other in a chain disengaged direction is avoided to thereby avoid disengagement of the pair of interlocking chains. The buckling restricting end faces in contact with each other balance the compression forces acting on the buckling restricting end faces in the same plane, i.e., a plane including the outer tooth plates. In this way, the inner tooth plates are firmly and reliably interlocked with each other, the firm and reliable interlocking between the outer tooth plates due to the interlocking between the inner tooth plates is achieved, and the rigidity of the pair of interlocking chains interlocked and integrated with each other is increased to thereby avoid the buckling and the twisting of the rigidified chain portion.

The respective buckling restricting end faces of the two outer tooth plates come in contact with each other in a diagonal direction with respect to the rigid chain forward and backward movement direction to thereby allow the compression forces acting on the buckling restricting end faces in the rigid chain forward and backward movement direction to escape in the above-described diagonal direction and also the hook-shaped interlocking end faces restrict disengagement of the pair of interlocking chains. Therefore, while avoiding loading of stress on the buckling restricting end faces, the inner tooth plates and the outer tooth plates are firmly and reliably interlocked with each other and the rigidity of the pair of interlocking chains interlocked and integrated with each other is increased to thereby reliably avoid the buckling and the twisting of the rigidified chain portion.

Any or all of the inner tooth plates, the outer tooth plates, and the coupling pins are elastically deformed to make the pair of interlocking chains rigid and to remove play between parts in forming the plate overlap regions. Therefore, while the interlocking chains are made rigid and the play between the parts is removed by the elastic deformation, backlash is further reduced. As a result, the inner tooth plates and the outer tooth plates are firmly and reliably interlocked with each other and the rigidity of the pair of interlocking chains interlocked and integrated with each other is increased to thereby further avoid the buckling and the twisting of the rigidified chain portion.

In the interlocking chain unit according to claim 2, in addition to the effects exerted by the interlocking chain unit according to claim 1, the pair of interlocking chains are interlocked with each other by the chain movement restricting means for restricting the movements of the pair of interlocking chains in the rigid chain forward and backward movement direction. Since the interlocking chains are interlocked with each other while the outer tooth plates and the inner tooth plates are guided in the rigid chain forward and backward movement direction, it is possible to achieve reliable interlocking between the pair of interlocking chains.

In the interlocking chain unit according to claim 3, in addition to the effects exerted by the interlocking chain unit according to claim 2, the chain movement restricting means is a drive sprocket provided in an interlocking chain type forward and backward actuating device configured to move a driven body forward and backward according to the chain forward and backward movements based on the interlocking and the disengagement of the pair of interlocking chains. Since the driven body is driven to move forward and backward by the rigidified chain portion having the increased rigidity, it is possible to achieve accurate forward and backward movements of the driven body to predetermined positions while avoiding buckling and twisting of the rigidified chain portion.

DETAILED DESCRIPTION OF THE PREFERRED EMBODIMENTS

An interlocking chain unit according to the present invention includes a pair of interlocking chains each formed by connecting, with pairs of front and rear coupling pins, a large number of inner tooth plates and a large number of outer tooth plates, which are arranged to be adjacent to outer sides of the inner tooth plates and have partial overlap regions with the inner tooth plates, in a chain longitudinal direction. The interlocking chains become interlocked with each other to integrally become rigid in a rigid chain forward and backward movement direction and become disengaged from each other to bifurcate. When the pair of interlocking chains become interlocked with each other, hook-shaped interlocking end faces of the two inner tooth plates interlocked with each other form plate overlap regions when the pair of interlocking chains are seen in a plate normal direction orthogonal to plate main faces of the inner tooth plates and the outer tooth plates, and buckling restricting end faces of the two outer tooth plates come in contact with each other in a diagonal direction with respect to the rigid chain forward and backward movement direction. The plate overlap regions are formed by outlines of the two plate overlap portions having outer edges defined by contact portion faces where the hook-shaped interlocking end faces of the two inner tooth plates are in contact with each other and flat buckling restricting end faces of the two outer tooth plates in contact with each other. General shapes of the outlines of the two plate overlap portions are point-symmetric about the point of intersection between the hook-shaped interlocking end faces and the buckling restricting end faces. Any or all of the inner tooth plates, the outer tooth plates, and the coupling pins are elastically deformed to make the pair of interlocking chains rigid and to remove play between parts in forming the plate overlap regions. If the interlocking chain unit according to the invention has the above-described structure, the invention may be carried out in any specific modes.

The interlocking chain unit may be constituted by a plurality of rows of chain units in which a large number of link units are respectively coupled in the chain longitudinal direction. The link unit includes inner tooth plates and outer tooth plates located outside of the inner tooth plates. An inner tooth plate and an outer tooth plate constitute one set of the link unit facing in the chain width direction. The interlocking chain unit may also be constituted by a chain unit of a single row.

The effects exerted by the above-described buckling restricting end faces of the outer tooth plates and the hook-shaped interlocking end faces of the inner plates are exerted similarly when the outer plates and the inner plates are replaced with each other, i.e., the buckling restricting end faces of the inner tooth plates and the hook-shaped interlocking end faces of the outer tooth plates are replaced with each other.

Effects similar to the above-described effects are exerted if recessed notches are formed at parts of the hook-shaped interlocking end faces or the buckling restricting end faces of one of the pair of interlocking chains.

The interlocking chain type forward and backward actuating device including the interlocking chain units according to the invention does not cause any problem in forward and backward operations even if an installation face is a floor face where the interlocking chain type forward and backward actuating device stands or a ceiling face where the interlocking chain type forward and backward actuating device is suspended. Further, even if the installation face is a vertical wall face where the interlocking chain type forward and backward actuating device is cantilevered, the device has no trouble in the above-described forward and backward movements.

Embodiments

An interlocking chain unit 100 according to one embodiment of the invention will be described below based on FIGS. 1 and 2.

Figure 1:
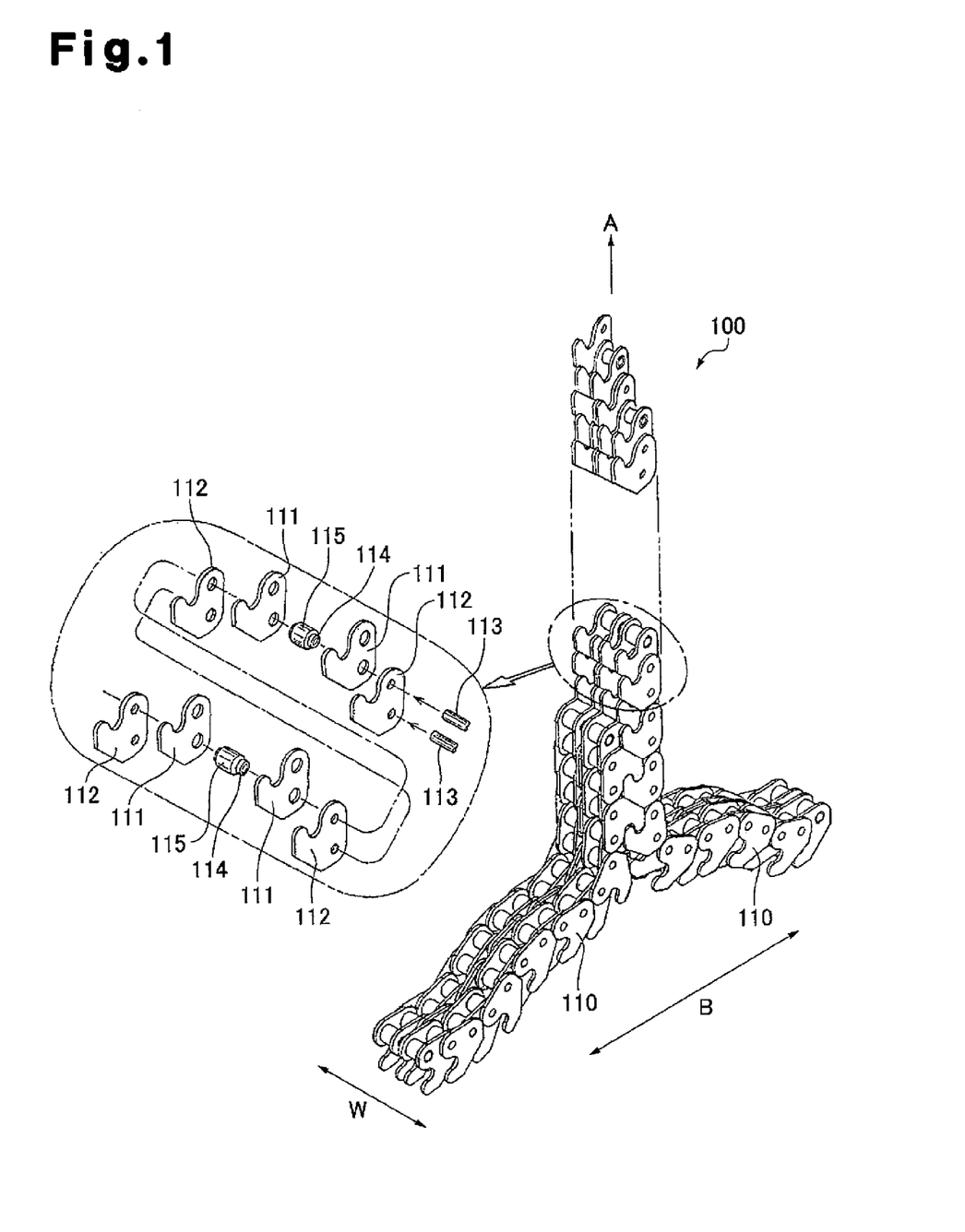
FIG. 1 is a perspective view of an exploded state of an interlocking chain unit according to one embodiment of the present invention.
Figure 2:
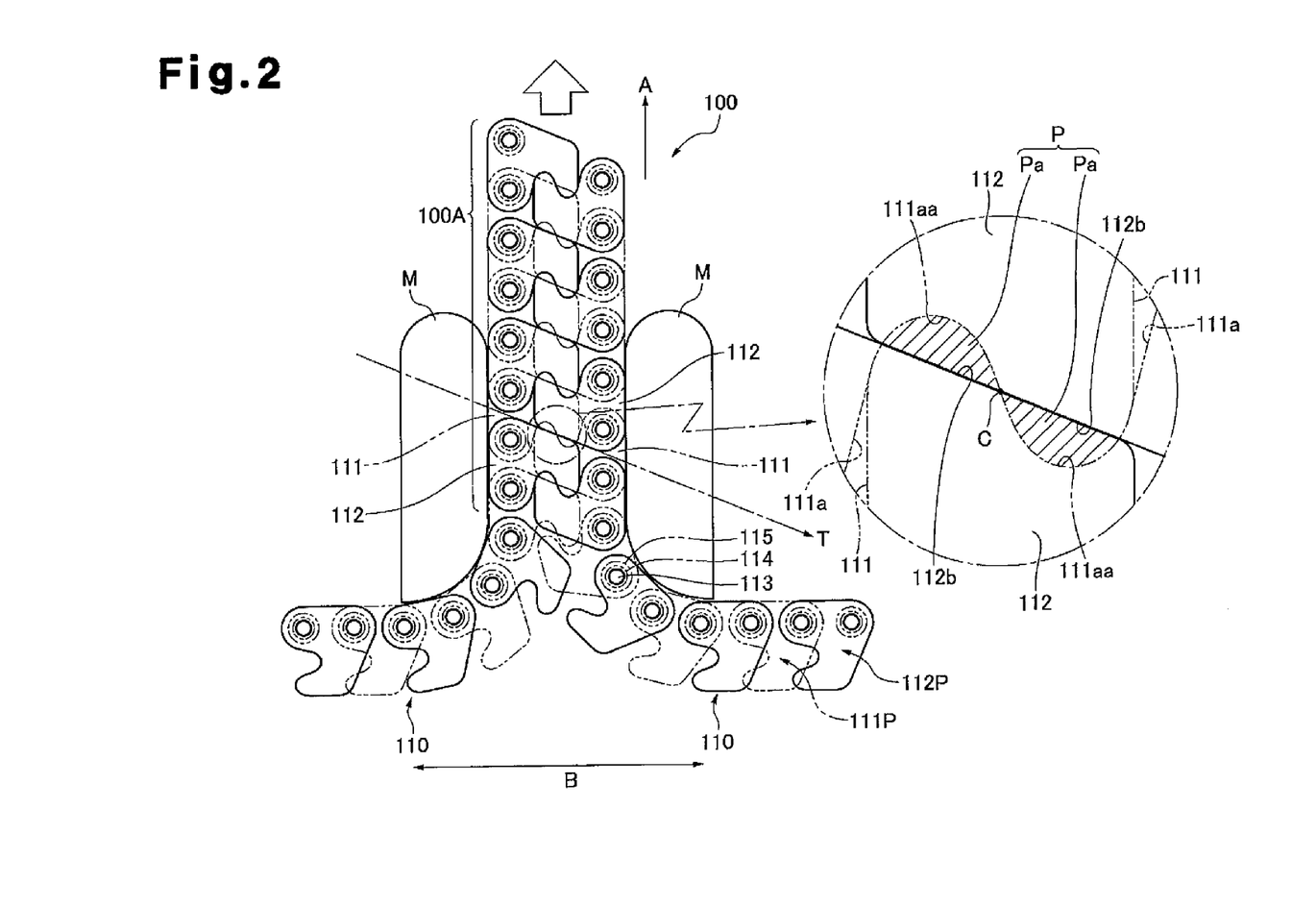
FIG. 2 is a front view of an interlocked portion where a pair of interlocking chains are interlocked with each other.

FIG. 1 is a perspective view of an exploded state of the interlocking chain unit according to the embodiment of the invention, and FIG. 2 is a front view of an interlocked portion where a pair of interlocking chains are interlocked with each other.

As shown in FIGS. 1 and 2, the interlocking chain unit 100 according to the embodiment is what is called a zip chain and includes a pair of interlocking chains 110, 110 each formed by connecting, with pairs of front and rear coupling pins 113, 113, a large number of inner tooth plates 111 and a large number of outer tooth plates 112, which are arranged to be adjacent to outer sides of the inner tooth plates 111 and have partial overlap regions with the inner tooth plates 111, in a chain longitudinal direction. The interlocking chains 110, 110 become interlocked with each other to integrally become rigid in a rigid chain forward and backward movement direction A and become disengaged from each other to bifurcate.

Rollers 115 are fitted over bushings 114, which are fitted in the inner tooth plates 111, into which the coupling pins 113 are loosely fitted, and which are respectively arranged between a pair of inner tooth plates 111, 111 facing each other in a chain width direction W.

Next, a concrete form of the most characteristic structure of the above-described interlocking chain unit 100 of the embodiment will be described in more detail based on FIGS. 1 and 2.

The interlocking chain unit 100 is formed such that, when the pair of interlocking chains 110, 110 become interlocked with each other, the hook-shaped interlocking end faces 111a, 111a of the two inner tooth plates 111, 111 interlocked with each other form plate overlap regions P when the pair of interlocking chains 110, 110 are seen in a plate normal direction, i.e., a chain width direction W, which is orthogonal to the plate main faces 111P, 112P of the inner tooth plates 111 and the outer tooth plates 112. The plate overlap regions P are formed by the outlines of the two plate overlap portions Pa, Pa having the outer edges defined by the contact portion faces 111aa, 111aa, where the hook-shaped interlocking end faces 111a, 111a of the two inner tooth plates 111, 111 contact each other and the flat buckling restricting end faces 112b, 112b of the two outer tooth plates 112, 112 contact each other. General shapes of the outlines of the two plate overlap portions Pa, Pa are point-symmetric about the point C of intersection between the hook-shaped interlocking end faces 111a, 111a and the buckling restricting end faces 112b, 112b. As a result, without unevenness of compression forces acting on the buckling restricting end faces 112b on opposite sides of a center of the interlocking chain unit 100, displacement of the hook-shaped interlocking end faces 111a, 111a interlocked with each other in a chain disengaged direction B is avoided to avoid disengagement of the pair of interlocking chains 110, 110. The buckling restricting end faces 112b, 112b in contact with each other balance the compression forces acting on the buckling restricting end faces 112b, 112b in the same plane, i.e., a plane including the outer tooth plates 112. In this way, the inner tooth plates 111, 111 are firmly and reliably interlocked with each other, the firm and reliable interlocking between the outer tooth plates 112, 112 due to the interlocking between the inner tooth plates 111, 111 is achieved, and the rigidity of the pair of interlocking chains 110, 110 interlocked and integrated with each other is increased to thereby avoid the buckling and the twisting of the rigidified chain portion 100A.

The entire general shapes of the outlines of the two plate overlap portions Pa, Pa are not necessarily point-symmetric about the point C of intersection between the hook-shaped interlocking end faces 111a, 111a and the buckling restricting end faces 112b, 112b. If at least parts of the general shapes of the outlines of the two plate overlap portions Pa, Pa are point-symmetric about the point C of intersection, the above-described effects of avoiding the buckling and the twisting are sufficiently obtained.

In the interlocking chain unit 100, the buckling restricting end faces 112b, 112b of the two outer tooth plates 112, 112 come in contact with each other in a diagonal direction T with respect to the rigid chain forward and backward movement direction A to thereby allow the compression forces acting on the buckling restricting end faces 112b, 112b in the rigid chain forward and backward movement direction A to escape in the above-described diagonal direction T and also the hook-shaped interlocking end faces 111a, 111a restrict disengagement of the pair of interlocking chains 110, 110. Therefore, while avoiding loading of stress on the buckling restricting end faces 112b, 112b, the inner tooth plates 111, 111 and the outer tooth plates 112, 112 are firmly and reliably interlocked with each other and the rigidity of the pair of interlocking chains 110, 110 interlocked and integrated with each other is increased to thereby reliably avoid the buckling and the twisting of the rigidified chain portion 100A.

In the interlocking chain unit 100, any or all of the inner tooth plates 111, the outer tooth plates 112, and the coupling pins 113 are elastically deformed to make the pair of interlocking chains rigid and to remove play between parts in forming the plate overlap regions P. Therefore, while the interlocking chains 110, 110 are made rigid to remove the play between the parts due to the elastic deformation, backlash is further reduced. As a result, the inner tooth plates 111, 111 and the outer tooth plates 112, 112 are firmly and reliably interlocked with each other and the rigidity of the pair of interlocking chains 110, 110 interlocked and integrated with each other is increased to further avoid the buckling and the twisting of the rigidified chain portion 100A.

Moreover, in the interlocking chain unit 100, the pair of interlocking chains 110, 110 are interlocked with each other by chain movement restricting means M, M for restricting movements of the pair of interlocking chains 110, 110 in the rigid chain forward and backward movement direction A. Therefore, while the outer tooth plates 112 and the inner tooth plates 111 are guided into the rigid chain forward and backward movement direction A, the interlocking chains 110, 110 are interlocked with each other to thereby achieve reliable interlocking between the pair of interlocking chains 110, 110.

The chain movement restricting means M, M may be any means, if they retain the interlocking chain unit 100 from opposite sides and guide the interlocking chain unit 100 into the rigid chain forward and backward movement direction A in a region between the chain movement restricting means M, M.

Next, based on FIGS. 1 to 6, an interlocking chain type forward and backward actuating device 200 having the above-described interlocking chain units 100 will be described.

Figure 3:
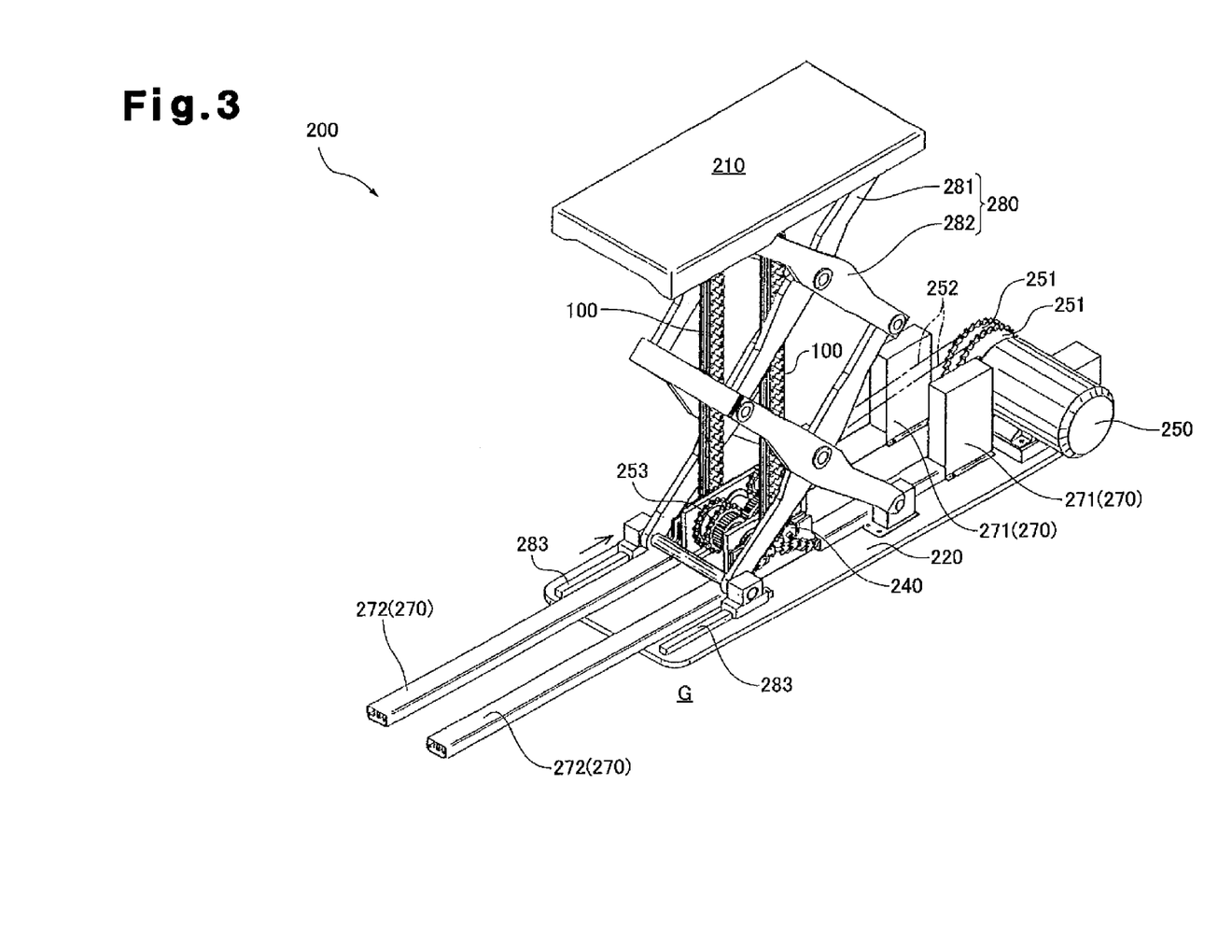
FIG. 3 is a perspective view of an interlocking chain type forward and backward actuating device including the interlocking chain units according to the invention.
Figure 4:
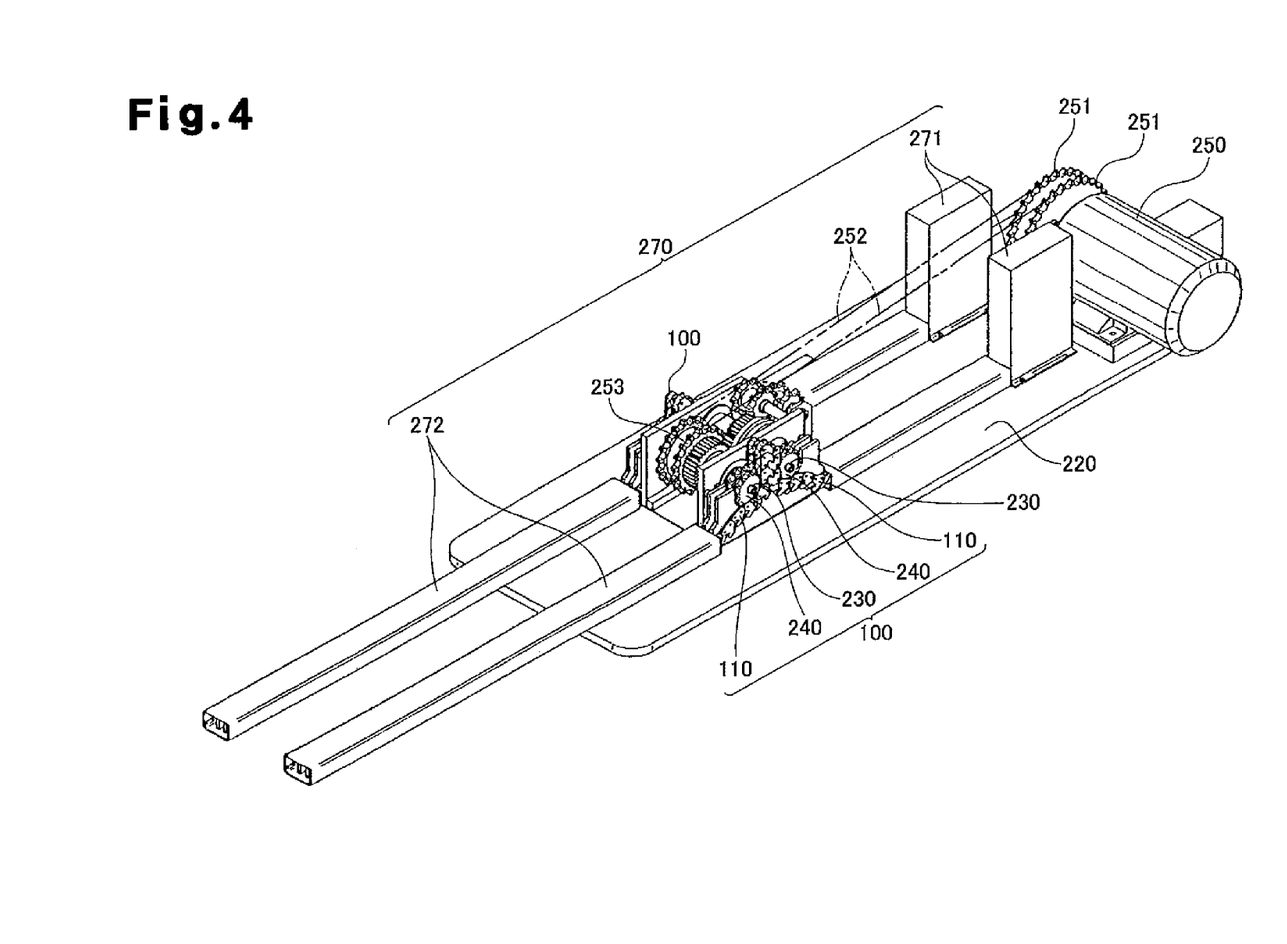
FIG. 4 is a perspective view of FIG. 3 from which a lifting table and a pantograph arm are removed.
Figure 5:
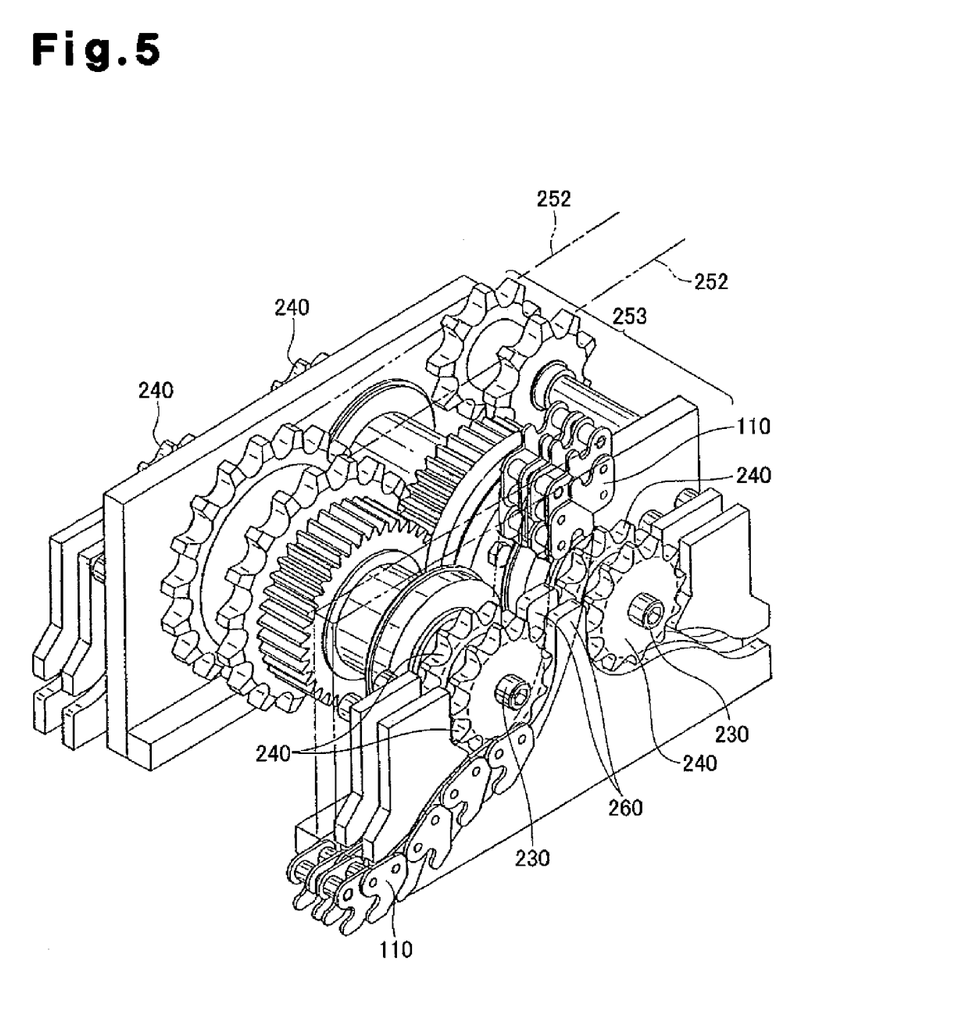
FIG. 5 is a partially enlarged view of a vicinity of a drive sprocket shown in FIG. 4.
Figure 6:
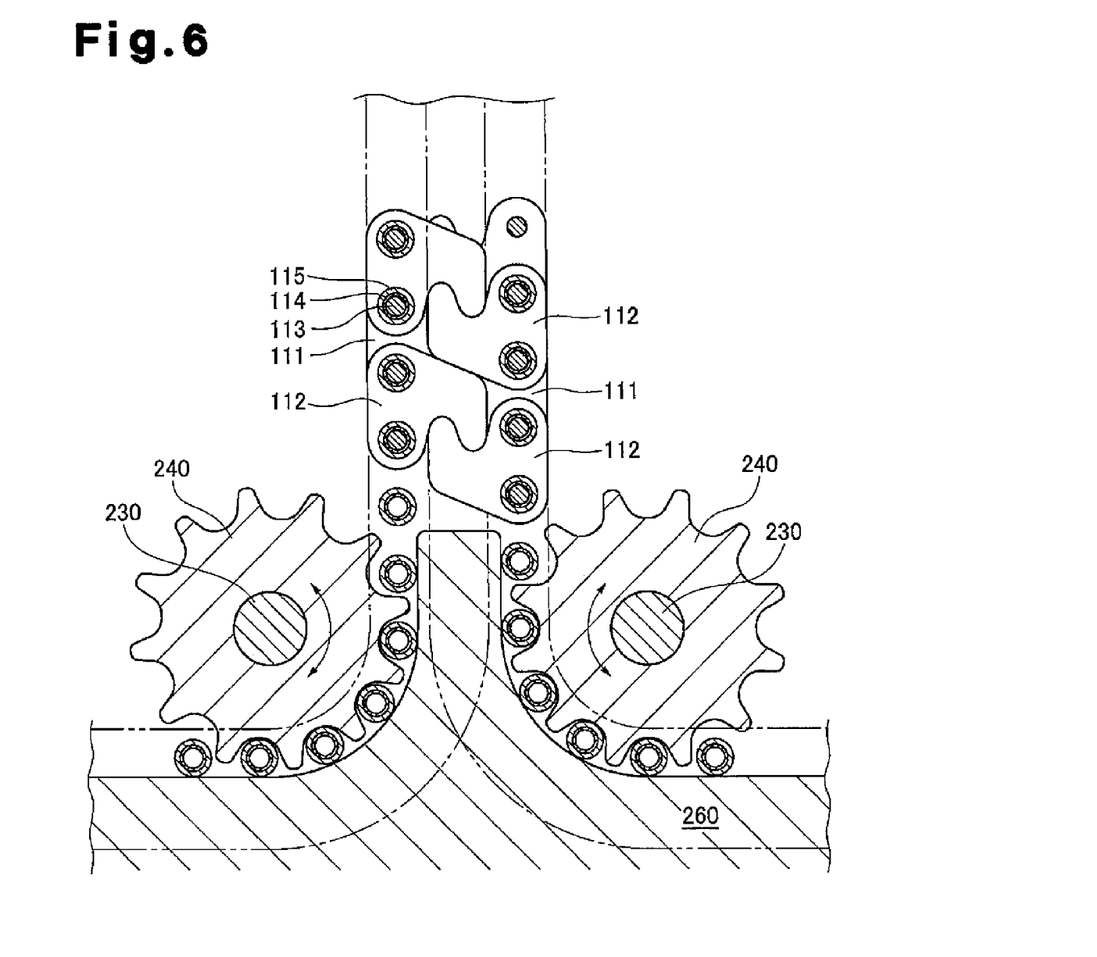
FIG. 6 is a diagram showing a state of contact between a chain guide plate and the interlocking chains.

FIG. 3 is a perspective view of the interlocking chain type forward and backward actuating device 200 including the interlocking chain units according to the invention. FIG. 4 is a perspective view of FIG. 3 from which a lifting table and a pantograph arm are removed. FIG. 5 is a partially enlarged view of a vicinity of a drive sprocket shown in FIG. 4. FIG. 6 is a diagram showing a state of contact between a chain guide plate and the interlocking chains.

The interlocking chain type forward and backward actuating device 200 having the above-described interlocking chain units 100 lifts and lowers a lifting table 210, on which a heavy object (not shown) is placed, in parallel with an installation floor face G as shown in FIG. 3.

As shown in FIGS. 3 to 6, the interlocking chain type forward and backward actuating device 200 includes the following as basic device structures: a base plate 220 mounted on the installation floor face G, with which the above-described lifting table 210 lifts and lowers in parallel; a pair of drive sprockets 240 facing each other and rotating in opposite directions, i.e., normal and reverse directions in the same plane and about a pair of rotating shafts 230 arranged parallel with the base plate 220; a pair of interlocking chain units 100, 100 each formed by paired pair of interlocking chains 110, 110 configured to lift and lower the lifting table 210 by becoming disengaged from the pair of drive sprockets 240, 240; the above-described lifting table 210 mounted to upper ends of the interlocking chain units 100, 100 and integrally lifting and lowering; power transmitting chains 252 for transmitting power to a speed changing gear set 253 for rotating the pair of drive sprockets 240, 240; a drive motor 250 for driving the power transmitting chains 252; and chain guide plates 260 provided in bifurcation regions between the pair of drive sprockets 240 to guide and move the interlocking chain units 100.

Chain housing means 270 are located in a region around the maximum lowering position of the lifting table 210, i.e., outside and away from a projected planform of the lifting table 210 similarly to the drive motor 250.

In other words, one of the pair of interlocking chains 110, 110 disengaged from each other is housed into the chain housing means 270 formed by a chain housing box 271 of a chain reeling type arranged on a side of the drive motor 250 and the other of the pair of interlocking chains 110, 110 is housed into the chain housing means 270 formed by a straight housing rail 272 arranged on an opposite side facing the drive motor 250.

The interlocking chain type forward and backward actuating device 200 is formed by providing a lifting and lowering assisting guide means 280, which is called an X-shaped pantograph arm and is formed by inner arms 281 and outer arms 282 by connecting upper and lower two stages, between the lifting table 210 and the base plate 220 on the installation floor face G to guide stable lifting and lowering movements of the lifting table 210.

Slide rails 283 slide lower ends of the inner arms 281 in response to the lifting and lowering movements.

Next, the lifting and lowering movements of the interlocking chain type forward and backward actuating device 200 including the interlocking chain units 100 according to the embodiment will be described based on FIGS. 3 and 6.

As shown in FIGS. 3 and 6, when the lifting table 210 reaches a maximum lifting position, the pair of interlocking chains 110, 110 are respectively unreeled from the chain housing means 270 formed by the chain housing box 271 and the straight housing rail 272 by the pair of drive sprockets 240, 240 interlocked with the rollers 115, and the pair of interlocking chains 110, 110 are lifted at equal speeds and swiftly by the two power transmitting chains 252 looped over output gears 251 according to output of the drive motor 250 while supporting total weight of the lifting table 210 on which a lifted and lowered object (not shown), which is a heavy object, is placed.

At this time, the above-described lifting and lowering assisting guide means 280, which is called the X-shaped pantograph arm and is formed by the inner arms 281 and the outer arms 282 by connecting the upper and lower two stages, guides the stable lifting movement of the lifting table 210.

On the other hand, when the lifting table 210 reaches the maximum lowering position, the pair of interlocking chains 110, 110 are disengaged from each other and respectively retracted into the chain housing means 270 formed by the chain housing box 271 and the straight housing rail 272 by the pair of drive sprockets 240, 240, and the pair of interlocking chains 110, 110 are lowered at equal speeds and swiftly by the two power transmitting chains 252 looped over the output gears 251 according to the output of the drive motor 250 while supporting the total weight of the lifting table 210, on which the heavy object (not shown) is placed.

At this time, the above-described X-shaped lifting and lowering assisting guide means 280 formed by the inner arms 281 and the outer arms 282 by connecting the upper and lower two stages guides the stable lowering movement of the lifting table 210 while being folded.

Particularly, in the interlocking chain type forward and backward actuating device 200, the drive sprockets 240, which are examples of the "chain movement restricting means" in the invention, move the lifting table 210, i.e., the driven body forward and backward according to the chain forward and backward movements based on the interlocking and disengagement of the pair of interlocking chains 110, 110. As a result, the rigidified chain portions 100A having the increased rigidity drives the lifting table 210 forward and backward. Therefore, the interlocking chain units 100 can accurately move the lifting table 210 forward and backward to the predetermined positions while avoiding buckling and twisting of the rigidified chain portions 100A.

In the interlocking chain unit 100 according to the embodiment and obtained as described above, when the pair of interlocking chains 110, 110 become interlocked with each other, the hook-shaped interlocking end faces 111a, 111a of the two inner tooth plates 111, 111 interlocked with each other form the plate overlap regions P when the pair of interlocking chains 110, 110 are seen in the plate normal direction, i.e., the chain width direction W, orthogonal to the respective plate main faces 111P, 112P of the inner tooth plates 111 and the outer tooth plates 112. The plate overlap regions P are formed by the outlines of the two plate overlap portions Pa, Pa having the outer edges defined by the contact portion faces 111aa, 111aa, where the hook-shaped interlocking end faces 111a, 111a of the two inner tooth plates 111, 111 are in contact with each other and the flat buckling restricting end faces 112b, 112b of the two outer tooth plates 112, 112 in contact with each other. The general shapes of the outlines of the two plate overlap portions Pa, Pa are point-symmetric about the point C of intersection between the hook-shaped interlocking end faces 111a, 111a and the buckling restricting end faces 112b, 112b. As a result, it is possible to obtain great advantages: for example, the inner tooth plates 111, 111 are firmly and reliably interlocked with each other, the firm and reliable interlocking between the outer tooth plates 112, 112 due to the interlocking between the inner tooth plates 111, 111 is achieved, and the rigidity of the pair of interlocking chains 110, 110 interlocked and integrated with each other is increased to thereby avoid the buckling and the twisting of the rigidified chain portion 100A.

DESCRIPTION OF THE REFERENCE NUMERALS

100 . . . interlocking chain unit
100A . . . rigidified chain portion
110 . . . interlocking chain
111 . . . inner tooth plate
111a . . . hook-shaped interlocking end face of inner tooth plate
111aa . . . contact portion face of inner tooth plate
112b . . . buckling restricting end face of outer tooth plate
111P, 112P . . . plate main face
112 . . . outer tooth plate
113 . . . coupling pin
114 . . . bushing
115 . . . roller
200 . . . interlocking chain type forward and backward actuating device
210 . . . lifting table
220 . . . base plate
230 . . . rotating shaft of drive sprocket
240 . . . driving sprocket
250 . . . drive motor
251 . . . output gear
252 . . . power transmitting chain
253 . . . group of speed change gears
260 . . . chain guide plate
270 . . . chain housing means
271 . . . chain housing box
272 . . . straight housing rail
280 . . . lifting and lowering assisting guide means
281 . . . inner arm
282 . . . outer arm
A . . . rigid chain forward and backward movement direction
B . . . chain disengaged direction
C . . . point of intersection
G . . . installation face
M . . . chain movement restricting means
P . . . plate overlap region
Pa . . . plate overlap portion
T . . . diagonal direction
W . . . chain width direction

The invention claimed is:

1. An interlocking chain unit comprising a pair of interlocking chains, wherein
   each interlocking chain is formed by connecting, with pairs of front and rear coupling pins, a plurality of inner tooth plates and a plurality of outer tooth plates in a chain longitudinal direction,
   the outer tooth plates are arranged to be adjacent to outer sides of the inner tooth plates and have partial overlap regions with the inner tooth plates, and
   the interlocking chains are configured to become interlocked with each other to integrally become rigid in a rigid chain forward and backward movement direction and to become disengaged from each other to bifurcate,
   wherein when the pair of interlocking chains are interlocked with each other, hook-shaped interlocking end faces of at least two inner tooth plates interlock with each other to form plate overlap regions when the pair of interlocking chains are seen in a plate normal direction, which is orthogonal to plate main faces of the inner tooth plates and the outer tooth plates,
   respective buckling restricting end faces of at least two outer tooth plates come in contact with each other in a diagonal direction with respect to the rigid chain forward and backward movement direction,
   the plate overlap regions are formed by outlines of two plate overlap portions of adjacent inner tooth plates, the plate overlap portions comprising outer edges defined by contact portion faces, where the hook-shaped interlocking end faces of the at least two inner tooth plates are in contact with each other, and flat buckling restricting end faces of the at least two outer tooth plates are in contact with each other,
   wherein the outlines of the two plate overlap portions are point-symmetric about a point of intersection between the hook-shaped interlocking end faces and the buckling restricting end faces, and
   at least one of the inner tooth plates, the outer tooth plates, and the coupling pins are elastically deformed to make the pair of interlocking chains rigid and to remove play between parts in forming the plate overlap regions.

2. The interlocking chain unit according to claim 1, wherein the pair of interlocking chains are interlocked with each other by chain movement restricting means for restricting movements of the pair of interlocking chains in the rigid chain forward and backward movement direction.

3. The interlocking chain unit according to claim 2, wherein the chain movement restricting means is a drive sprocket provided in an interlocking chain type forward and backward actuating device configured to move a driven body forward and backward according to chain forward and backward movements based on interlocking and disengagement of the pair of interlocking chains.

4. The interlocking chain unit according to claim 1, wherein the two plate overlap portions, which are point-symmetric about the point of intersection, have substantially the same area.

5. The interlocking chain unit according to claim 1, wherein the two plate-overlap portions of adjacent inner tooth plates have substantially the same area.

6. The interlocking chain unit according to claim 1, wherein the point of intersection is aligned and shares a common axis with a point of intersection of the buckling restricting end faces of the at least two outer tooth plates when the at least two outer tooth plates are in contact.

\* \* \* \* \*